United States Patent [19]

Schultz

[11] Patent Number: 4,622,190
[45] Date of Patent: Nov. 11, 1986

[54] METHOD OF MAKING WET PROCESS PANELS OF COMPOSITE WOOD MATERIAL WITH SEMI-MATCHING CONTOURED PRESSURE PLATES

[75] Inventor: William J. Schultz, St. Charles, Ill.

[73] Assignee: Masonite Corporation, Chicago, Ill.

[21] Appl. No.: 653,056

[22] Filed: Sep. 21, 1984

Related U.S. Application Data

[62] Division of Ser. No. 470,608, Feb. 28, 1983, abandoned.

[51] Int. Cl.[4] ............................................. B29C 43/02
[52] U.S. Cl. ................................... 264/119; 264/120; 264/316
[58] Field of Search ............... 264/119, 120, 139, 266, 264/316, 257; 162/117, 206, 305

[56] References Cited

U.S. PATENT DOCUMENTS

| 3,235,440 | 2/1966 | Gould | 264/119 |
|---|---|---|---|
| 3,312,999 | 4/1967 | Greten et al. | 264/120 |
| 3,661,688 | 5/1972 | Wheeler | 264/119 |
| 3,737,276 | 6/1972 | Hill et al. | 264/119 |
| 3,796,529 | 3/1974 | Greten | 264/120 |
| 3,880,975 | 4/1975 | Lundmark | 264/119 |
| 4,096,796 | 6/1978 | Saunders et al. | 264/120 |
| 4,111,744 | 9/1978 | Reiniger | 264/120 |
| 4,265,067 | 5/1981 | Palmer | 52/309.9 |
| 4,325,899 | 4/1982 | Cole et al. | 264/119 |
| 4,372,899 | 2/1983 | Wiemann et al. | 264/120 |

Primary Examiner—Donald Czaja
Assistant Examiner—Mary Lynn Fertig
Attorney, Agent, or Firm—Mason, Kolehmainen, Rathburn & Wyss

[57] ABSTRACT

A method of making panels of composite wood material in a wet process includes depositing a layer of wet composite wood material in a mat on a press wire screen mesh and moving the screen mesh to carry the mat into a pressing position between a pair of spaced apart pressure plates having generally matching, contoured facing surfaces for shaping the outer face and a smoothly contoured back face of the panel. The pressure plates are moved toward one another compressing the mat of wet material and biasing the supporting screen mesh to conform generally to the contour of one of the pressure plates. After a suitable time interval for molding, the pressure plates are moved apart and the press wire screen mesh is rewound on a roll to aid in separating the completed panel from the mesh. The finished panel is carried by the screen mesh away from the pressure plates for unloading as the screen is rolled up and the deformations formed in the screen during molding are flattened out as the screen is rewound on the roll.

17 Claims, 8 Drawing Figures

U.S. Patent  Nov. 11, 1986  Sheet 1 of 5  4,622,190
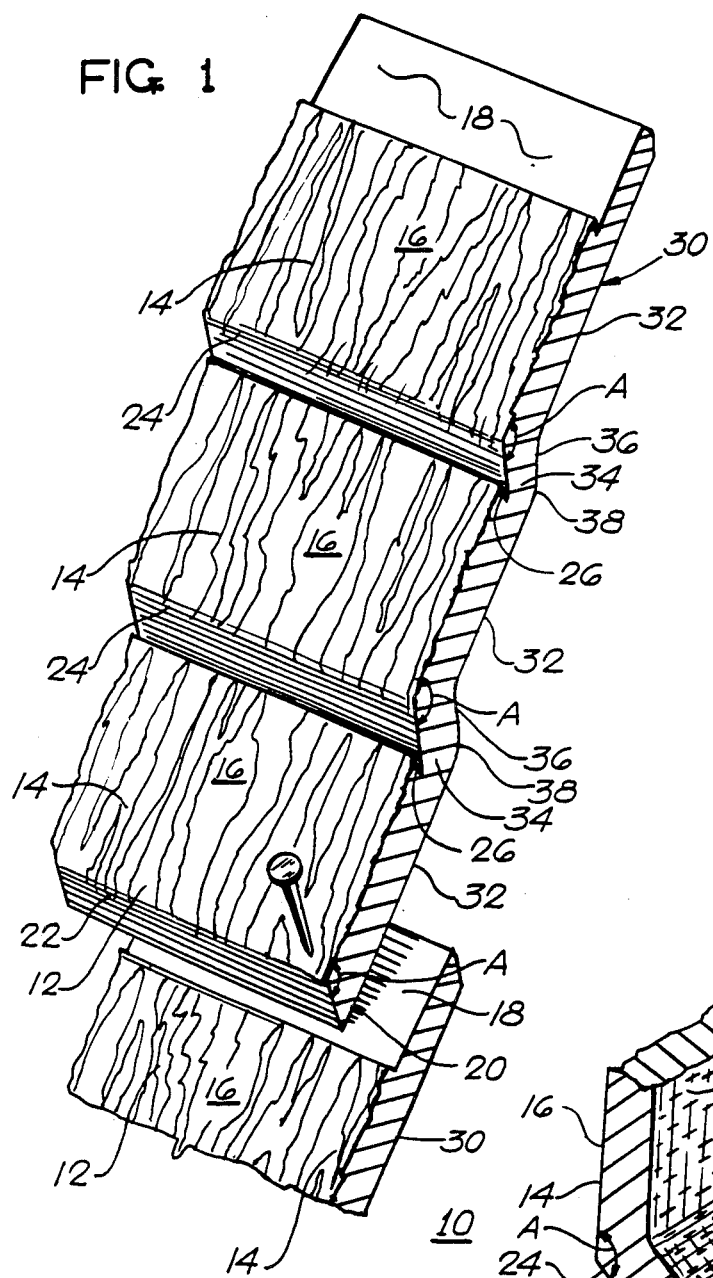
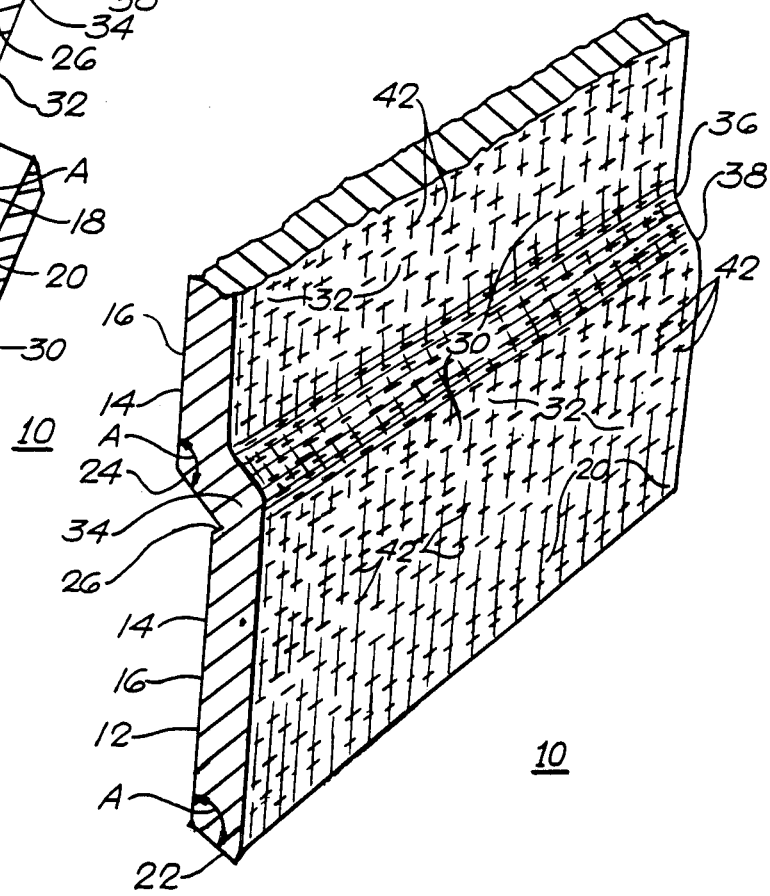

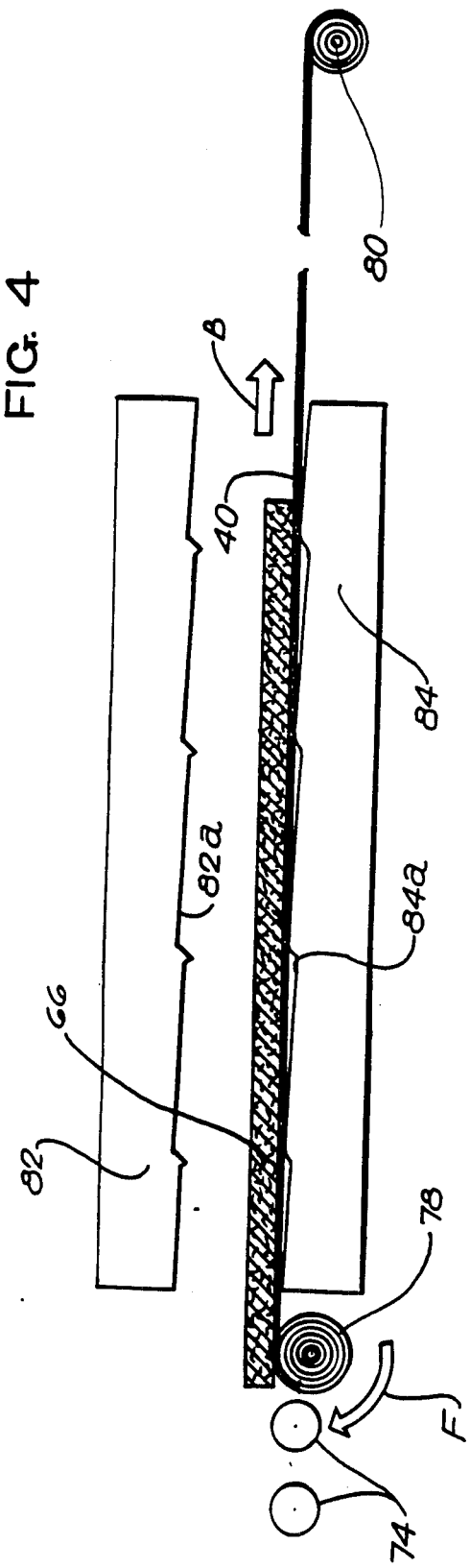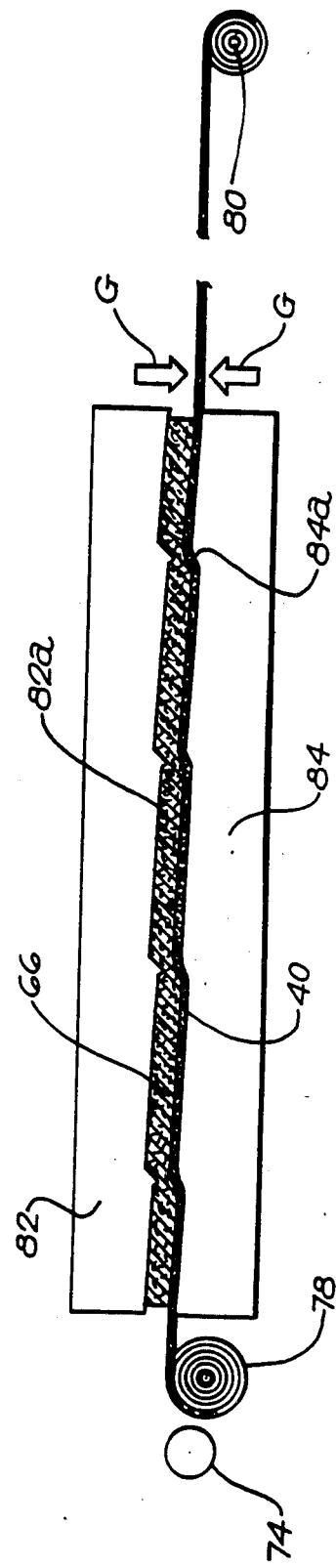

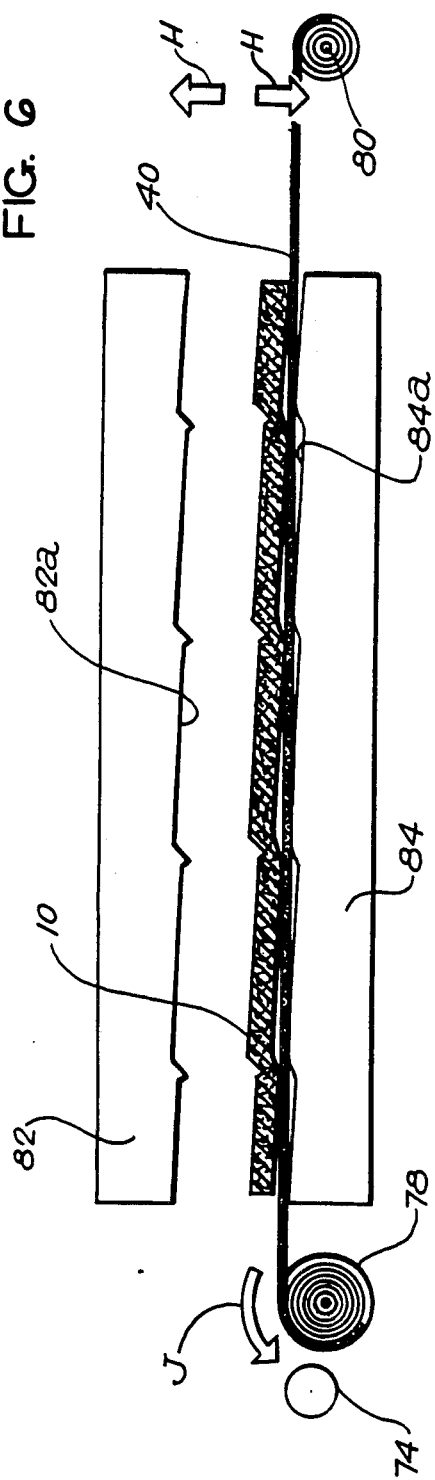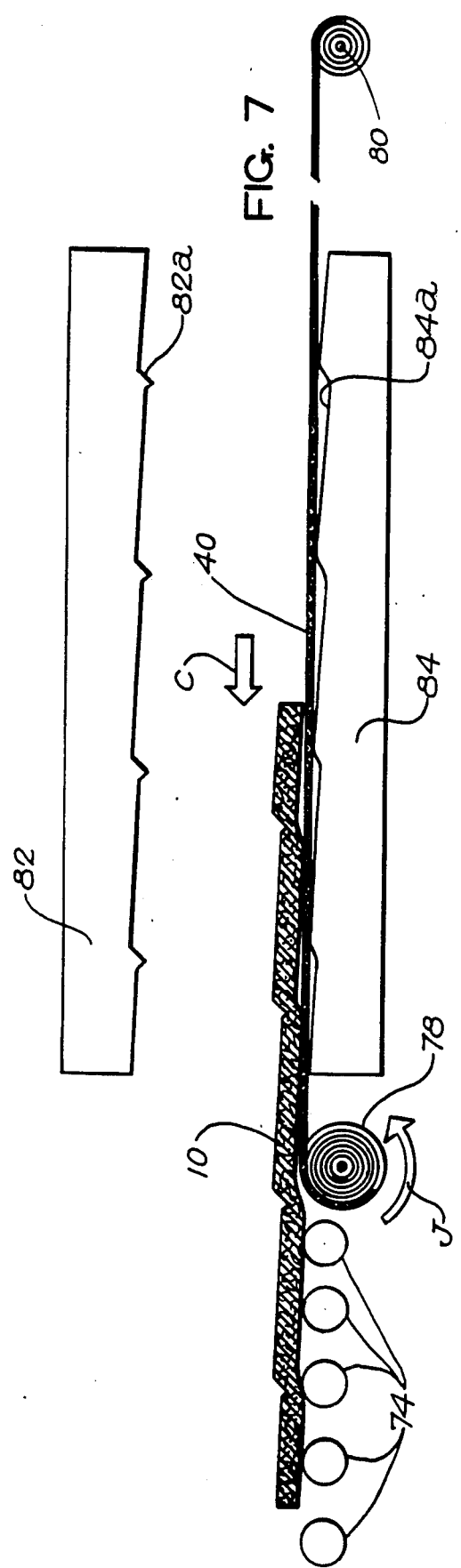

METHOD OF MAKING WET PROCESS PANELS OF COMPOSITE WOOD MATERIAL WITH SEMI-MATCHING CONTOURED PRESSURE PLATES

This application is a division, of application Ser. No. 470,608, filed Feb. 28, 1983, now abandoned.

BACKGROUND OF THE INVENTION

1. Field of the Invention

The present invention relates to a new and improved method for making panels of composite wood material in a wet process wherein the outer face of the panel is deeply embossed and the back side of the panel is formed with a smoothly contoured surface generally following or matching the contour of the outer face rather than a conventional planar or flat back face. As a result of the new and unique process of the invention, the panels have excellent machining and paint absorption characteristics, and a much lower and more uniform moisture absorption rate than panels heretofore available. The panels have a lesser tendency to buckle or crack in the regions of relatively sharp relief on the outer face and are more stable in place after use and exposure in comparison to panels produced with molded or machined outer faces and a flat or planar back face.

2. Description of the Prior Art

In the past, panels of composite wood materials such as hardboard, fiberboard, flakeboard, chipboard, plywood and the like, having an embossed outer face with areas of deep relief therein, have a back side that is substantially planar or flat. This results in panels having wide variations in thickness at random positions over the surface area. In panels that were molded or formed under heat and pressure in a wet process from various types of wood composite materials, areas in the outer surface having deep relief or sharp angled intersections are often of high density and brittle structure resultng in premature cracking and excessive compression of the wood fibers. This resulted in uneven paint and moisture absorption characteristics, brittleness and cracking after exposure to and in general, pockets and/or streaks of materials of non-uniform density were present at various random locations on and below the outer surface of the panels. Moreover, when a deeply embossed outer face and a planar or flat back face is provided, there is a wide variety of thickness variations in the panels.

In the Greimer et al U.S. Pat. No. 4,061,813, a combination sheathing and support member is disclosed wherein contoured pressure molding dies are utilized to form a component of cellulosic particles and/or fibers with an adhesive binder in a single pressing operation.

In U.S. Pat. No. 4,188,762 a triple-lap harboard siding product is disclosed wherein relatively sharply angled intersecting surfaces on the outer face of the siding are formed in costly and time consuming machining operations. Such machining operations sometimes tend to leave exposed fiber ends on the outer surface of the siding member and such exposed fiber ends often cause excessive moisture absorption and swelling, as well as uneven paint or stain absorption.

OBJECTS OF THE INVENTION

It is an object of the present invention to provide a new and improved method for making panels of composite wood materials in a wet process, and more particularly it is desirable to provide a new and improved method of the character described wherein three basic components are utilized, namely, an upper embossing plate having a contoured molding face, a bottom or lower backing plate having a back face molding surface generally matching or following that of the upper plate but having smoothly rounded contours, and finally, a deformable press wire screen mesh for carrying a mat of wet composite wood material into a pressing position between the plates with said press wire mesh being deformed to follow the contour of the lower plate when heat and pressure is applied to the mat of material for molding the panel into final shape.

Another object of the present invention is to provide a new and improved panel made of composite wood material in a wet process wherein the thickness and density of the panel material is more nearly uniform throughout and wherein better machining characteristics are provided.

Another object of the invention is to provide a panel formed in a wet process having more uniform and constant paint absorption qualities, more uniform and lower moisture absorption characteristics and a greater resistance to buckling, cracking, checking, and splitting after use and exposure.

BRIEF SUMMARY OF THE INVENTION

The foregoing and other objects and advantages of the present invention are accomplished in a new and unique method of making panels formed of composite wood material in a wet process wherein the panels have a deeply embossed outer face and a non-planar back face having a contour generally matching that of the outer face. A layer of wet composite wood material is deposited in a mat on a press wire screen mesh and the screen mesh is moved inwardly between a pair of spaced apart pressure plates having contoured facing surfaces designed for shaping and molding an outer face and a back face of the panel under heat and pressure. After the thick wet mat is carried into molding position between the open press plates, the press plates are moved toward one another to compress the mat and expell the moisture. During the compression molding process, the pressure of the mat of material deforms the screen mesh to conform to the contour of the back plate. The screen mesh functions to permit the moisture in the material to escape through the voids between wires of the screen around the sides of the press plates. After the molding pressure and heating from the press plates has been maintained for a required time interval, the press plates are opened and the screen mesh is rolled up to remove the finished panel from between the plates. The deformations in the screen wire mesh formed during the molding process are straightened out as the mesh is rolled up while carrying the finished panel to an unloading position away from the press plates.

New and unique panels are formed of composite wood material in the wet process method as described and the panels include an outer face deeply embossed and a non-planar back face having a smoothly flowing contour that generally matches the contour of the outer face but without any areas of sharp angular relief or deep depressions. Because the contours of the front and back face of the panels are generally matched and because the back face need not be flat or planar, areas or pockets of high fiber stress, fiber crushing and breaking are generally eliminated resulting in a panel having a more uniform thickness, better machining characteristics, more uniform paint absorption characteristics, a substantially reduced tendency to absorb moisture and overall, an excellent appearance which can be designed to closely resemble a plurality of clapboards, lap siding members or wood shingles laid up in overlapping relationship. The panels are more stable in dimension, have good weathering capabilities and do not tend to break, crack, split, check or bend because of random areas or pockets of high fiber stress or fiber breakage. Moreover, because the back face is non-planar and generally (not precisely) follows the contours of the outer face, less material is needed with little or no sacrifice in strength or other properties.

BRIEF DESCRIPTION OF THE DRAWINGS

For a better understanding of the present invention, reference should be had to the following detailed description taken in conjunction with the drawings, in which:

FIG. 1 is a fragmentary, perspective view of an outer face of a new and improved panel formed of composite wood material in a wet process in accordance with the features of the present invention;

FIG. 2 is a fragmentary, perspective view of a back face of the panel of FIG. 1;

FIGS. 4, 5, 6 and 7 illustrate in animated fashion, the cyclical action of a press wire screen mesh and contoured press plates as used when forming panels in accordance with the present invention.

DESCRIPTION OF A PREFERRED EMBODIMENT

Figure 3:
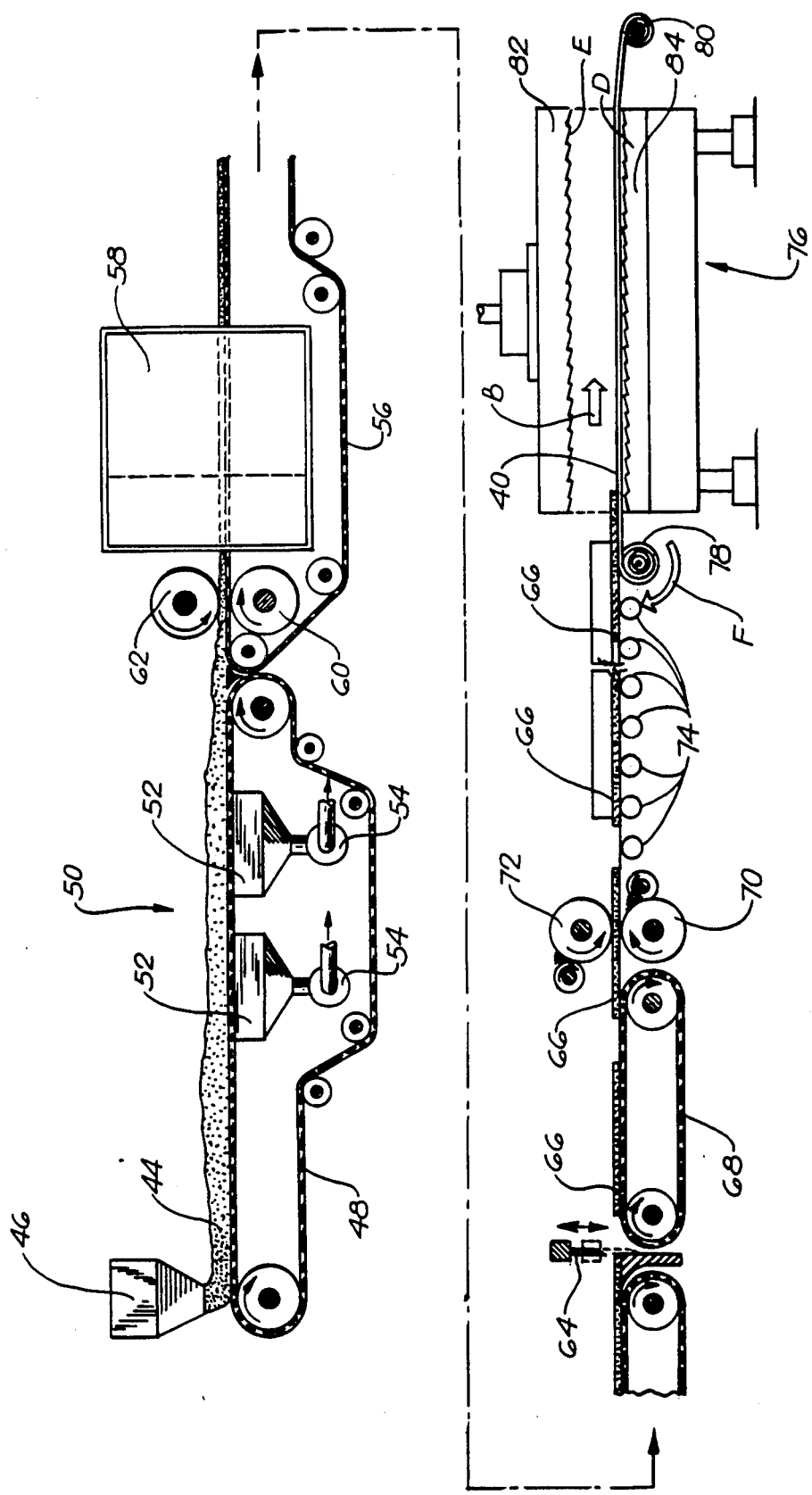
FIG. 3 is a side elevational view of process apparatus used for making panels in accordance with the present invention.

Referring now to the drawings, particularly FIGS. 1 and 2, in accordance with a new and improved method of the present invention, panels 10 formed of composite wood materials such as fiber board, flake-board, chip board, hardboard, plywood etc. are produced for use on walls, roofs, vehicles, furniture, cabinets, doors etc. The panels 10 have an outer face 12 which is deeply embossed to provide patterns or designs in deep relief such as a plurality of individual clapboards, lap siding members or shingles 14 laid up in conventional overlapping relation with outer face segments 16 generally parallel and offset from one another as illustrated.

Along an upper edge of the panel, the outer face 12 is formed with a flat or planar narrow lap surface 18 adapted to underlie and tightly seal against a flat or planar lower portion 20 formed on the back face of a next adjacent panel(s) when a plurality of panels are laid up in overlapping relation. Each panel is formed with a lower butt edge 22 which may be irregular as shown or smooth and planar. The butt edge intersects a lower portion of an outer face 16 of a lower lap siding or shingle member at a relatively sharp acute angle "A" which may range from 45° to 90° or greater. Similar intermediate butt edge surfaces 24 may be formed between the upper edge of each successively siding or shingle face portion 16 and the lower edge of the next adjacent siding or shingle face on the panel.

The intermediate butt edges 24 and the lower butt edge 22 of the siding panels are generally parallel and the intermediates may be smooth and planar in the case of lap siding members or somewhat irregular in the case of shingles as illustrated. The intermediate butt edges 24 are also arranged to lie at a relatively sharp acute angle "A" with respect to the adjacent faces 16 of the lap siding or shingle elements of the panel. In addition, a small, shallow, V-shaped groove 26 may be formed in the outer face 12 of the panel extending along the base or junction between an intermediate butt edge 24 and a next adjacent face 16.

In accordance with the present invention, the panels 10 are manufactured of wet process hardboard with a non-planar, but smoothly contoured back face 30 having staggered or offset, generally flat or planar segments 32 generally parallel to and opposite of respective siding or shingle faces 16 on the outer face 12. Because the back face 30 is non-planar and generally matches or conforms with the contour or cross-sectional profile of the outer face 12, the panels 10 are much more uniform in thickness over the entire surface area than a panel with a flat or planar back face. The narrow lap face 18 along the upper edge and regions or zones 34 generally defined between the outer face and the back face of the panel along the intermediate butt edges 24 are somewhat thinner than the overall average thickness of the panel. Adjacent the zones 34, the back face 30 is formed with smooth, gradually curved concave and convex transition surfaces 36 and 38, respectively, with a pair of concave and convex transition surfaces provided between each pair of adjacent offset, planar back face segments 32.

The radii of curvature of the concave and convex transition surfaces 36 and 38 are relatively large in relation to the nominal thickness of the panels 10. For example, a radius of curvature in the order of 1.5" may be typical for a panel having a nominal thickness of 7/16" and the back face segments 32 may be offset in parallel with one another by an offset dimension of 0.187" which is generally similar to the amount of offset between the generally parallel outer siding or shingle faces 16.

The angular relationship as represented by the angles "A" between the lower and intermediate butt edges 22 and 24 and the adjoining siding or shingle faces 16 may vary widely and may range from as low as 40° to 45° up to as high as 90° and this high range angle or relief is provided without creating pockets of brittle, high density material immediately adjacent thereto. This result is achieved because of the smoothly contoured, generally matching or semi-matching profile of the back face 30 and the gently flowing transition surfaces 36 and 38 which smoothly join together the offset, parallel back face segments 32. With a flat or planar back face as in panels heretofore available, a much greater variation in panel thickness results and this in turn results in material being wasted where it is not needed for strength or other useful purposes.

Even though the outer face 12 does include relatively sharp angles of relief (angles "A") between the siding or shingle faces 16 and the adjoining butt edges 22 and 24, very little, if any, fiber breakage or excessive fiber compression occurs in the molded panels 10 of composite wood material. On the other hand, with a flat or planar back face of the prior art and an outer face having a deeply embossed pattern with relatively sharp relief angles, fiber breakage and excessive fiber stressing often occurs resulting in the formation of brittle, dense pockets of material around the high stress concentration areas. It should be noted that the cross-sectional profile or contour of the outer face 12 and that of the back face 30 are not precisely matched or parallel but instead are only generally or semi-matched in profile or shape, but this generalized matching or semi-matching concept results in a panel 10 having less variation in thickness over the entire surface area and less material being needed to provide a pattern with comparable deep relief such as lap siding elements.

Because the panels 10 are formed in a wet hardboard process with composite wood material in a wet mat supported and carried on a press wire screen mesh 40 during the molding process, the back face of the finished panels 30 becomes indented over substantially the entire surface area with small, cross-like, indentations 42 which are formed by the individual crossing wires or strands of the press wire screen mesh.

Referring now to FIGS. 3 through 7, in accordance with the method of the present invention, panels 10 are produced from a thick, wet, mixture of composite wood material in a layer 44 which is discharged at a controlled rate and thickness from a feed hopper 46 onto a perforated endless chain or belt 48 of a "Fourdrinier" type apparatus generally indicated by the numeral 50. As the wet layer of composite wood material moves from the feed hopper 46 along the upper run of the perforated belt 48, water and excess liquid is drained therefrom and one or more collecting hoppers 52 with pumps 54 may be provided to take away the moisture and liquid collected from the flowing wet layer of composite wood material.

The thickness of the moving layer is gradually reduced along the length of the upper run of the belt as the material drys out somewhat and the layer moves onto the upper run of a second belt 56 which passes through a drying oven 58 after passage between a pair of thickness reducing, sizing rollers 60 and 62. These rolls reduce the thickness of the wet layer of composite wood material and squeeze out additional moisture. At the discharge end of the perforated belt 56 there is provided a cut off or shear 64 which cuts the continuous layer into discrete sections or mats 66 of finite length and width (for example 4'×16'). These mats are carried by another endless perforated belt 68 to feed between a final set of thickness reducing or sizing rollers 70 and 72. From the final sizing rollers, the thick mats 66 of wet composite wood material are passed onto a roller table having a plurality of idler rolls 74 spaced apart at appropriate intervals to support the relatively stiff thick mats in a position ready for molding.

In accordance with the present invention, when each mat 66 reaches a lead position on the roller table closely adjacent a hydraulic press 76, a leading edge of the mat is positioned in overlapping relation on a wound-up roll 78 of the press wire screen mesh 40 as shown in FIG. 3. A leading edge of the press wire screen mesh is attached to a transverse axle 80 which is movable reciprocally in a horizontal direction as illustrated by the arrows "B" and "C" in FIGS. 3, 4 and 7. As a molding cycle is commenced, the pull rod carries the leading edge of the wire mesh from left to right (as indicated by the arrow "B" in FIGS. 3 and 4) and the press wire is unrolled against a counter clockwise spring bias which tends to retain the mesh in a rolled up condition.

As the screen mesh is pulled from the roll 78, the outer layer of screen moves in a clockwise direction as indicated by the arcuate arrows "F" in FIGS. 3 and 4, and the mat 66 is carried by the screen into the press 76 to a "molding" position between an upper press plate or platen 82 and a lower press plate or backer plate 84. Each pair of semi-matching upper and lower press plates used in the hydraulic press 76 are relatively movable toward and away from each other in a vertical direction as indicated by the arrows "G" and "H" (FIGS. 5 and 6). The press plates move vertically between an open position (FIGS. 3, 4, 6 and 7), and a closed or "molding" position (as shown in FIG. 5) wherein a thick mat 66 of wet composite wood material is squeezed and compressed under heat and pressure to form or mold the finished panels 10 with a deeply embossed outer face 12 and a semi-matched contoured, non-planar back face 30 as illustrated in FIGS. 1 and 2.

The upper press plate 82 is formed with a contoured, deeply embossed lower molding surface 82a adapted to form and mold the outer face 12 of the panels 10 and the lower backer plate 84 is provided with an upper, contoured surface 84a semi-matching or generally following the contour or profile of the surface 82a of the upper press plate.

Referring to FIG. 5, when the upper and lower press plates are moved together as indicated by the arrows "G" to compress and mold the thick wet mat of composite wood material into a thin, finished panel 10, the press wire screen mesh 40 is deflected and deformed by the material and is pressed against the contour of the upper face 84a to generally conform to the profile thereof. As this occurs the voids between the screen wires permit moisture in liquid or vapor form to escape from the mat around the edges along the back plate 84, while the material is being molded in tight compression between the closely spaced molding surfaces 82a and 84a. The mold plates are heated to a desired temperature level to help permanently set and form the outer face and the back face of the panels 10 and after a desired mold time interval has expired, the press plates are opened or moved apart (arrows "H" FIG. 6).

As the plates open, the press wire screen mesh 40 is rewound on the roll 78 and as the mesh wraps around the roll it is flattened out or straightened and pulled away from the back face of the panels. The amount of the tension may be controlled by the amount of counterclockwise bias exerted on the screen roll 78 as indicated by the arrows "J" in FIGS. 6 and 7.

When the pressure plates 82 and 84 of the hydraulic press 76 are moved apart as indicated by the arrows "H" in FIG. 6, after the molding process has been completed, the press wire screen mesh 40 tends to reassume a flat or planar condition spaced slightly above and away from the contoured face 84a of the lower backer plate 84. This phenomenon aids in lifting and extracting, a completed molded panel 10 away from the lower backer plate. After mold extraction is started the mesh 40 is moved toward the left to transport a completed molded panel in the direction of the arrow "C" towards an unloading position away from the press 76. As the screen mesh 40 is rewound on the roll 78, the mesh is pulled away from the back face 30 of the panel and the screen mesh is flattened out as it is wound up on the roll. After the finished panels 10 are positioned on the idler rolls 74 they are removed and another mat 66 is quickly moved into position ready for the molding process as just described.

The flexible, press wire screen mesh 40 serves multiple purpose functions. The mesh is used for transporting a thick wet mat 66 of composite wood materials into a "molding" position between the press plates 82 and 84.

During the molding process as the mat is squeezed and compressed, the mesh provides a means for escapement of the moisture and liquid from the material even though the screen is deformed and deflected to follow the profile of the backer plate because of the force exerted by the compressed wood material. Thereafter, when the mold is opened, the press wire screen mesh is used to transport the finished panel away from the plates of the press. As the screen mesh is rewound on the roll 78 the mesh is flattened out and this aids in separating the back face 30 of the finished molded panels 10 away from the screen mesh.

Figure 8:
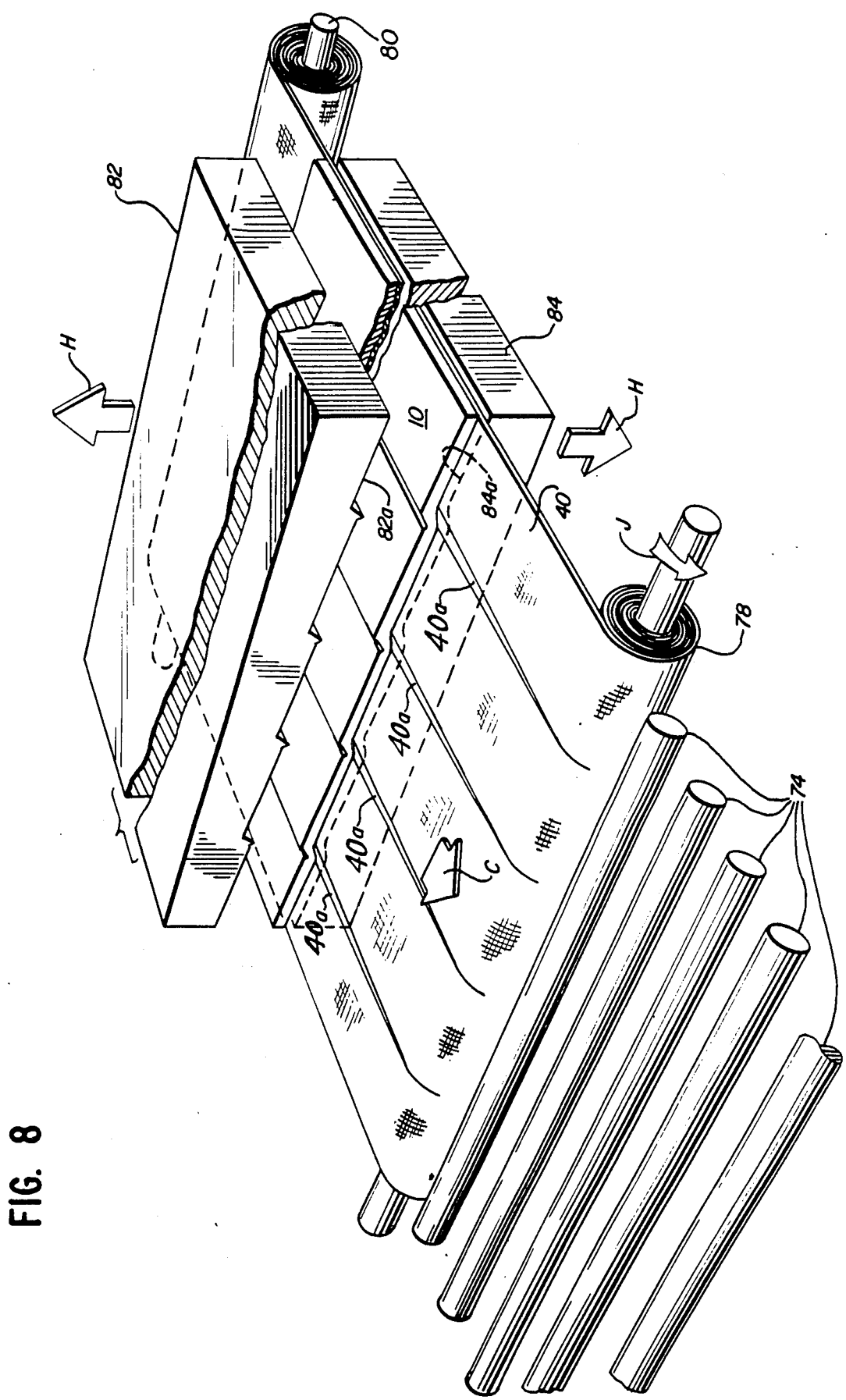
FIG. 8 is a perspective view of another embodiment of process apparatus used for making panels in accordance with the features of the present invention.

Referring now to FIG. 8 therein is illustrated another embodiment of process apparatus for making panels 10 in accordance with the invention wherein the press plates 82 and 84 are orientated so that major areas of deformation 40a produced in the mesh during the molding operation run in a direction generally parallel to the path of transport of the panels into and out of the press.

As illustrated, when the mesh 40 is rewound on the roll 78 as indicated by the arrow J and the finish panels 10 are transported out of the press, the deformations 40a formed during the molding operation are ironed out or flattened out by the roll up action. The deformation areas 40a run generally parallel of the arrow "C" as illustrated and are narrowed down or tapered gradually to flatten out as the screen mesh approaches the roll 78. This action is effective in reforming the mesh with a minimum of stress and provides excellent screen mesh life characteristics and increased intervals of usage before replacement is required.

Because the cross-sectional profile or contour of the back face 30 of the panels 10 is smooth and flowing without any regions of sharp angular relief therein, the supporting press wire screen mesh 40 is able to function as described in an effective manner for long periods of time without excessive wire failure or breakage and without plugging up the mesh to any great degree with the composite wood materials being used. Repeated deformation and flexing of the mesh occurs during molding and reverse flexing of the press wire screen mesh occurs during rewinding on the roll 78. The latter action is especially effective for separating finished panels 10 from the mesh itself and yet the impressions 42 from the screen left in the back face 30 of the finished panels are not cause for concern.

Although the present invention has been described with reference to an illustrated embodiment thereof, it should be understood that numerous other modifications and embodiments can be made by those skilled in the art that will fall within the spirit and scope of the principles of this invention.

What is claimed as new and desired to be secured by Letters Patent is:

1. A method of making a non-planar, contoured hardboard building panel of composite wood fibre material in a wet process, said panel having an outer contoured face and a generally matching contoured back face, said method comprising the steps of:
    depositing a layer of wet, composite wood material in a relatively thick wet mat of wood fibres on a press wire screen mesh while said mesh is under tension for supporting said mat;
    moving said tensioned screen mesh to carry said mat into a pressing position between a pair of spaced apart pressure plates having generally matched, contoured facing surfaces thereon for shaping said outer face and said back of face to generally match the contour of said outer face;
    relaxing the tension on said screen mesh after said mesh and mat is between said pressure plates;
    relatively moving said pressure plates toward one another to compress said thick mat of wet composite wood material to consolidate the fibres into a substantially thinner shell comprising a non-planar, contoured hardboard panel while forcing and deforming said screen mesh while tension thereof is relaxed against adjacent one of said pressure plates to generally conform to the contoured face thereof;
    maintaining said pressure plates in a selected spaced apart relation for a time interval to permanently mold and shape said faces of said non-planar, contoured hardboard panel while permitting moisture from said wet composite wood material to escape around the edges of said compressed mat through voids provided between wires of said screen mesh while tension thereof is relaxed;
    moving said pressure plates away from one another to release the pressure on said panel faces from said pressure plates;
    retensioning said screen mesh to lift said non-planar, contoured hardboard panel away from said one pressure plate; and
    moving said retensioned screen mesh to carry said non-planar, contoured hardboard panel away from said pressing position between said pressure plates to an unloading position wherein said panel is separated from said screen mesh.

2. The method of claim 1 wherein:
said press wire screen mesh is wound on a roll outside said pressure plates and is unwound from said roll for moving said mat into said pressing position.

3. The method of claim 2 wherein:
said press wire screen mesh is rewound on said roll for moving said panel out of said pressing position into said unloading position.

4. The method of claim 3 wherein:
said rewinding of said press wire screen on said roll flattens out deformations of said screen mesh for aid in separating said mesh away from said back face of said panel.

5. The method of claim 4 wherein:
said deformations of said press wire screen mesh extend in a direction generally parallel of the direction of movement of said panels toward and away from said pressure plates.

6. The method of claim 1 wherein said depositing step occurs as said screen mesh is moving to carry said mat into said pressing position.

7. The method of claim 6 wherein said screen mesh is in a relatively flat condition as said mat is deposited therein.

8. The method of claim 1 wherein any tension on said screen mesh is relaxed when said mat reaches said pressing position.

9. The method of claim 8 wherein said movement of said pressure plates to compress said mat occurs while said tension on said screen mat is relaxed permitting said screen mesh to more readily conform to the contour of said one pressure plate.

10. The method of claim 8 wherein said compression of said mat by said pressure plates exerts sufficient pressure on said screen mesh to deform the same to generally match the contour of said one pressure plate.

11. The method of claim 1 wherein said screen mesh is separated from said panel by winding said mesh on a roll away from said one panel face.

12. The method of claim 11 wherein said winding of said screen mesh on a roll returns said mesh to a flattened condition when unrolled to carry a mat into said pressing position.

13. A method of making a building panel of non-planar, contoured shape formed of composite wood fibre material in a wet process, said panel having an outer contoured face and a generally matching contoured back face, said method comprising the steps of:

depositing a layer of relatively thick wet, composite wood material in a mat on a relatively flat portion of a press wire screen mesh while said mesh is under tension and thereafter moving said mesh and mat while said mat is supported on said flat portion thereof into a pressing position spaced between a pair of spaced apart upper and lower pressure plates, said plates having generally matched, contoured facing surfaces thereon for shaping said outer face and said back face, said lower plate having an upper, nonplanar, surface contoured to generally match the contour of a lower surface of said upper plate;

relaxing the tension on said flat mesh portion while it is supporting said mat above said upper non-planar surface of said lower plate;

relatively moving said pressure plates toward one another to compress and consolidate the wood fibres of said mat of wet composite wood material into a relatively thin non-planar, contoured hardboard building panel while forcing and deforming said screen mesh against said lower plate to generally conform to a contoured upper surface thereof;

maintaining said pressure plates in compressive contact with said compressed mat for a selected time interval to mold and shape said outer and back faces of said non-planar, contoured panel while permitting moisture from said wet composite wood material to escape around the edges of said compressed mat through voids provided between wires of said screen mesh while said tension is relaxed and said mesh portion is deformed to the non-planar contour of said upper surface of said lower plate;

moving said pressure plates away from one another to release pressure on said panel faces exerted from said pressure plates;

retensioning said screen mesh to lift said non-planar contoured hardboard panel away from said contoured upper surface of said lower pressure plate; and moving said retensioned screen mesh to carry said molded panel away from the pressing portion between said pressure plates.

14. The method of claim 13 wherein said panel is moved away from between said pressure plates carried on said screen mesh.

15. The method of claim 13 wherein said layer of wet composite material is deposited in a mat on said press wire screen mesh and thereafter said mat is carried on said mesh into a pressing position between said spaced apart upper and lower press plates.

16. The method of claim 13 wherein tension on said screen mesh is relaxed before relative movement of said pressure plates to compress said mat.

17. The method of claim 13 wherein said upper surface of said lower pressure plate has gentle changes in contour for permitting said mesh to be deformed against the same by the pressure exerted by said compressed wet mat of composite wood material.

* * * * *